United States Patent
Ishida et al.

(10) Patent No.: US 9,065,089 B2
(45) Date of Patent: Jun. 23, 2015

(54) FUEL CELL

(71) Applicant: HONDA MOTOR CO., LTD., Tokyo (JP)

(72) Inventors: Kentaro Ishida, Wako (JP); Narutoshi Sugita, Wako (JP); Shuhei Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 13/848,740

(22) Filed: Mar. 22, 2013

(65) Prior Publication Data
US 2013/0252131 A1 Sep. 26, 2013

(30) Foreign Application Priority Data
Mar. 26, 2012 (JP) ................................. 2012-070076

(51) Int. Cl.
*H01M 8/02* (2006.01)
*H01M 8/10* (2006.01)

(52) U.S. Cl.
CPC .......... *H01M 8/0258* (2013.01); *H01M 8/1004* (2013.01); *H01M 8/0267* (2013.01); *Y02E 60/50* (2013.01); *Y02E 60/521* (2013.01)

(58) Field of Classification Search
CPC ............ H01M 8/0258; H01M 8/0267; H01M 8/0273; H01M 8/0289; H01M 8/1004

USPC .......... 429/457, 458, 460, 463, 483, 507–510
See application file for complete search history.

(56) References Cited

U.S. PATENT DOCUMENTS

| 7,396,610 | B2 | 7/2008 | Barnett et al. | |
|---|---|---|---|---|
| 2004/0214071 | A1* | 10/2004 | Barnett et al. | ................... 429/44 |
| 2009/0291350 | A1* | 11/2009 | Ishida et al. | ................... 429/34 |
| 2010/0310957 | A1 | 12/2010 | Sugiura et al. | |

FOREIGN PATENT DOCUMENTS

| JP | 2010-282868 | 12/2010 |
|---|---|---|
| WO | WO 2011114811 A1 * | 9/2011 |
| WO | WO 2011158551 A1 * | 12/2011 |

OTHER PUBLICATIONS

Chinese Office Action for corresponding CN Application No. 201310070494.6, Dec. 29, 2014.

* cited by examiner

*Primary Examiner* — Gregg Cantelmo
(74) *Attorney, Agent, or Firm* — Mori & Ward, LLP

(57) ABSTRACT

A fuel cell includes a membrane electrode assembly, a first separator, and a second separator. The membrane electrode assembly includes a first electrode, a second electrode, a resin frame member, and an electrolyte membrane. The resin frame member includes a first surface, a second surface, a first buffer portion, and a second buffer portion. The first buffer portion is provided on the first surface of the resin frame member. The second buffer portion is provided on the second surface of the resin frame member. The second buffer portion is independent from the first buffer portion.

9 Claims, 17 Drawing Sheets

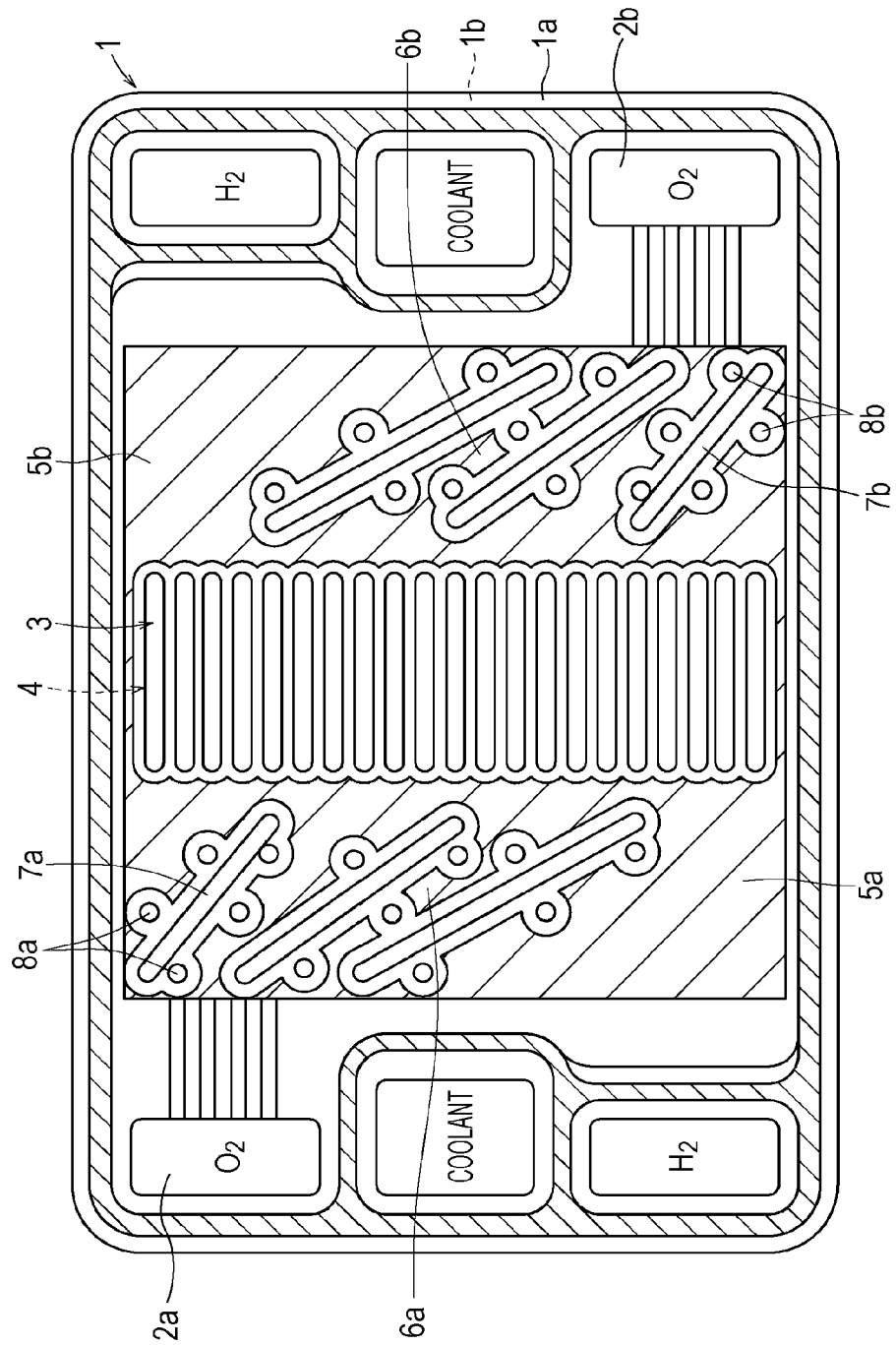

FUEL CELL

CROSS-REFERENCE TO RELATED APPLICATIONS

The present application claims priority under 35 U.S.C. §119 to Japanese Patent Application No. 2012-070076, filed Mar. 26, 2012, entitled "Fuel Cell." The contents of this application are incorporated herein by reference in their entirety.

BACKGROUND OF THE INVENTION

1. Field of the Invention

The present disclosure relates to a fuel cell.

2. Discussion of the Background

For example, a solid polymer electrolyte fuel cell includes a power generation cell (unit cell) including a membrane electrode assembly (MEA) and separators sandwiching the MEA therebetween. The MEA includes a solid polymer electrolyte membrane, which is made from a polymer ion-exchange membrane, and an anode electrode and a cathode electrode sandwiching the solid polymer electrolyte membrane therebetween. A fuel cell in which several tens or hundreds of such power generation cells are stacked is used, for example, as a vehicle mounted fuel cell stack.

A fuel cell typically includes a so-called internal manifold for supplying a fuel gas and an oxidant gas, which are reactant gases, respectively to the anode electrode and to the cathode electrode of each of power generation cells that are stacked.

An internal manifold includes reactant gas inlet manifolds (a fuel gas inlet manifold and an oxidant gas inlet manifold) and reactant gas outlet manifolds (a fuel gas outlet manifold and an oxidant gas outlet manifold), which extend in a stacking direction in which the power generation cells are stacked. Each reactant gas inlet manifold is connected to the inlet side of a corresponding one of reactant gas channels (a fuel gas channel or an oxidant gas channel), through which a reactant gas is supplied along an electrode surface. Each reactant gas outlet manifold is connected to the outlet side of a corresponding one of the reactant gas channels.

In this case, the width of the opening of the reactant gas inlet manifold and the width of the opening of the reactant gas outlet manifold are set considerably smaller than the width of the reactant gas channel. Therefore, in order to make the reactant gas flow uniformly and smoothly through the reactant gas channel, it is necessary to provide a buffer portion in the vicinity of each of the reactant gas inlet manifold and the reactant gas outlet manifold.

For example, Japanese Unexamined Patent Application Publication No. 2010-282868 discloses a fuel cell illustrated in FIG. 17, in which an oxidant gas channel 3 is formed on a surface 1a of a cathode-side metal separator 1 so as to be connected to an oxidant gas inlet manifold 2a and an oxidant gas outlet manifold 2b. On a surface 1b of the cathode-side metal separator 1, a coolant channel 4 is formed on the back side of the oxidant gas channel 3.

Linear guide protrusions 7a and 7b and embossed portions 8a and 8b are formed on the cathode-side metal separator 1. The linear guide protrusions 7a and 7b protrude from medium height portions 5a and 5b toward the oxidant gas channel 3 and form connection guide channels 6a and 6b. The embossed portions 8a and 8b protrude from the medium height portions 5a and 5b toward the coolant channel 4 and form embossed channels.

With such a structure, water generated on the oxidant gas channel 3 side can be smoothly discharged using the cathode-side metal separator 1 having a wave-like shape, and a coolant can smoothly flow through the coolant channel 4.

SUMMARY OF THE INVENTION

According to one aspect of the present invention, a fuel cell includes a membrane electrode assembly, a first separator, and a second separator. The membrane electrode assembly includes a first electrode, a second electrode, a resin frame member, and an electrolyte membrane provided between the first electrode and the second electrode in a stacking direction. The resin frame member is disposed on an outer periphery of the membrane electrode assembly. The membrane electrode assembly is provided between the first separator and the second separator in the stacking direction. Each of the first and second separators includes a reactant gas channel through which a reactant gas is to be supplied along an electrode surface of membrane electrode assembly and a reactant gas manifold through which the reactant gas is to flow in the stacking direction. The resin frame member includes a first surface, a second surface, a first buffer portion, and a second buffer portion. The second surface is opposite to the first surface in the stacking direction. The first buffer portion is provided on the first surface of the resin frame member. The first buffer portion is located outside of a power generation region of the membrane electrode assembly and connected to the reactant gas channel of the first separator. The second buffer portion is provided on the second surface of the resin frame member. The second buffer portion is located outside of the power generation region and connected to the reactant gas channel of the second separator. The second buffer portion is independent from the first buffer portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 17 is a front view of a cathode-side metal separator of an existing fuel cell.

DESCRIPTION OF THE EMBODIMENTS

Figure 1:
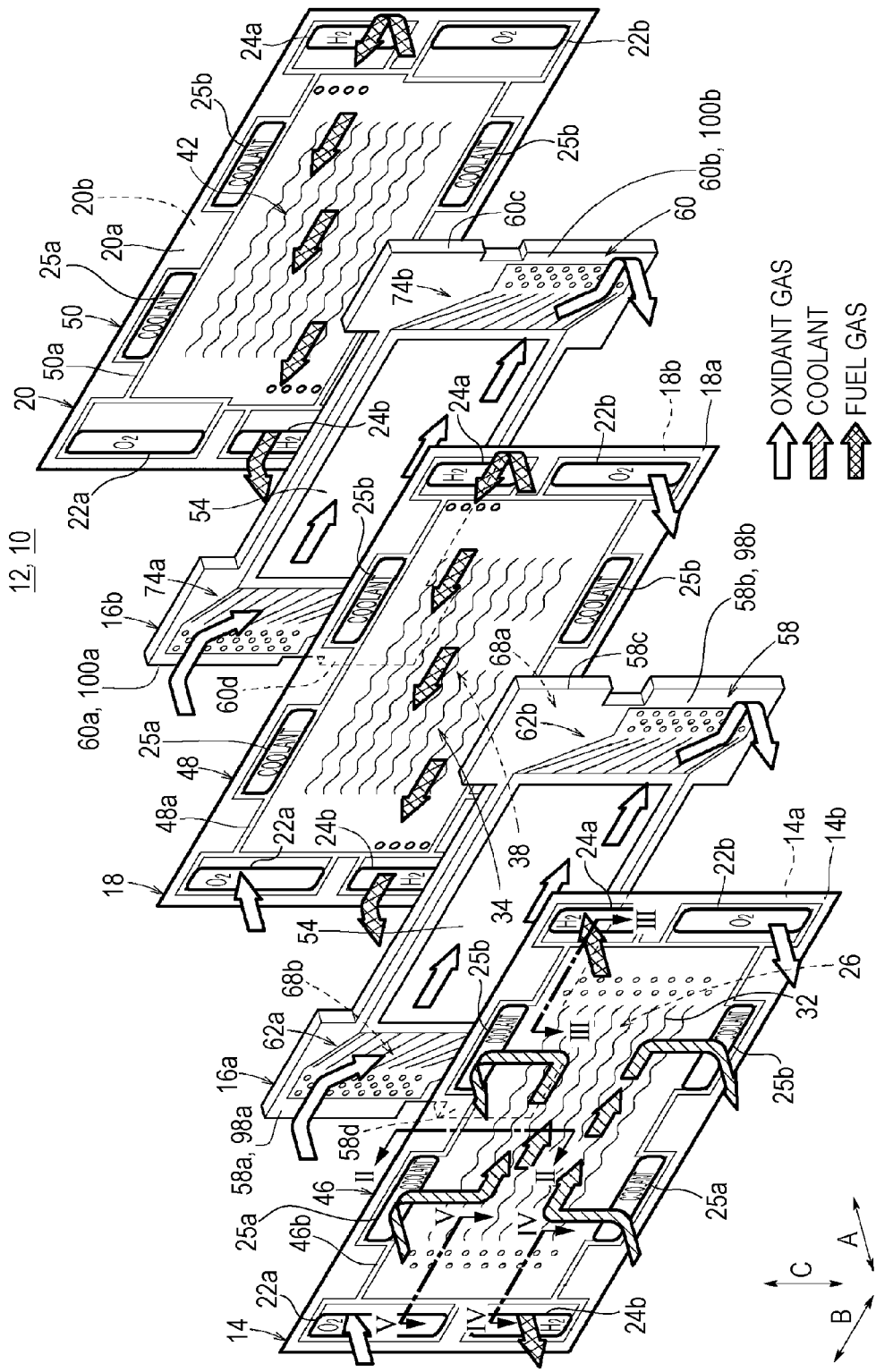
FIG. 1 is an exploded perspective view of a power generation unit of a fuel cell according to a first embodiment.

The embodiments will now be described with reference to the accompanying drawings, wherein like reference numerals designate corresponding or identical elements throughout the various drawings.

As illustrated in FIGS. 1 to 5, a fuel cell 10 according to a first embodiment includes a plurality of power generation units 12 that are stacked in the horizontal direction (direction of arrow A). Alternatively, the power generation units 12 may be stacked in the vertical direction (direction of arrow C). Each power generation unit 12 includes a first metal separator 14, a first membrane electrode assembly 16a, a second metal separator 18, a second membrane electrode assembly 16b, and a third metal separator 20.

Each of the first metal separator 14, the second metal separator 18, and the third metal separator 20 is made from a metal plate having a rectangular shape, such as a steel plate, a stainless steel plate, an aluminum plate, a galvanized steel plate, or any of such plates having an anti-corrosive coating thereon. Each of the first metal separator 14, the second metal separator 18, and the third metal separator 20 has a rectangular shape in plan view and is made by press forming a thin metal plate so as to have a wave-like pattern having an undulating cross sectional shape.

As illustrated in FIG. 1, an oxidant gas inlet manifold 22a and a fuel gas outlet manifold 24b extend in the direction of arrow A through one end portion of the power generation unit 12 in the longitudinal direction (direction of arrow B). To be specific, the one end portion corresponds to end portions of the first metal separator 14, the second metal separator 18, and the third metal separator 20. An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b extend in the direction of arrow A through the other end portion of the power generation unit 12 in the longitudinal direction. The fuel gas is supplied through the fuel gas inlet manifold 24a. The oxidant gas is discharged through the oxidant gas outlet manifold 22b.

A pair of coolant inlet manifolds 25a extend in the direction of arrow A through both end portions of the power generation unit 12 in the lateral direction (direction of arrow C) on the oxidant gas inlet manifold 22a side of the power generation unit 12. A coolant is supplied through the coolant inlet manifolds 25a. A pair of coolant outlet manifolds 25b extend in the direction of arrow A through both end portions of the power generation unit 12 in the lateral direction on the fuel gas inlet manifold 24a side of the power generation unit 12. The coolant is discharged through the coolant outlet manifolds 25b.

Figure 6:
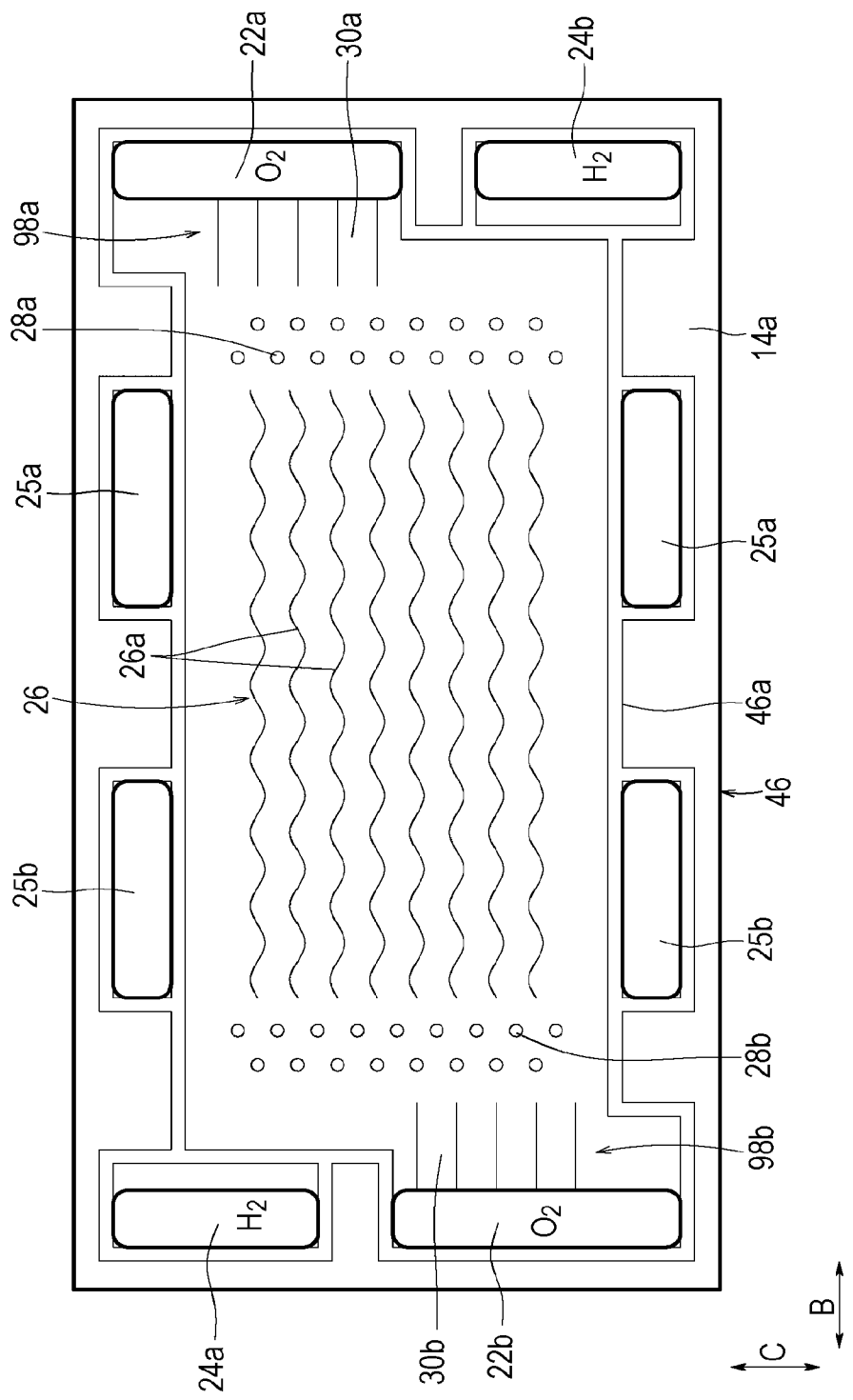
FIG. 6 is a front view of a first metal separator of the power generation unit.

As illustrated in FIG. 6, a first oxidant gas channel 26, through which the oxidant gas inlet manifold 22a and the oxidant gas outlet manifold 22b are connected to each other, is formed on a surface 14a of the first metal separator 14 facing the first membrane electrode assembly 16a.

The first oxidant gas channel 26 includes a plurality of wave-shaped (or linear) channel grooves 26a extending in the direction of arrow B. A plurality of inlet embossed portions 28a and a plurality of outlet embossed portions 28b are respectively formed in the vicinities of the inlet and the outlet of the first oxidant gas channel 26.

A plurality of inlet connection grooves 30a, which serve as a bridge portion, is formed between the inlet embossed portions 28a and the oxidant gas inlet manifold 22a. A plurality of outlet connection grooves 30b, which serve as a bridge portion, is formed between the outlet embossed portions 28b and the oxidant gas outlet manifold 22b.

As illustrated in FIG. 1, a coolant channel 32, through which the pair of coolant inlet manifolds 25a and the pair of coolant outlet manifolds 25b are connected to each other, is formed on a surface 14b of the first metal separator 14. The coolant channel 32 is formed between the back side of the first oxidant gas channel 26 and the back side of a second fuel gas channel 42.

Figure 7:
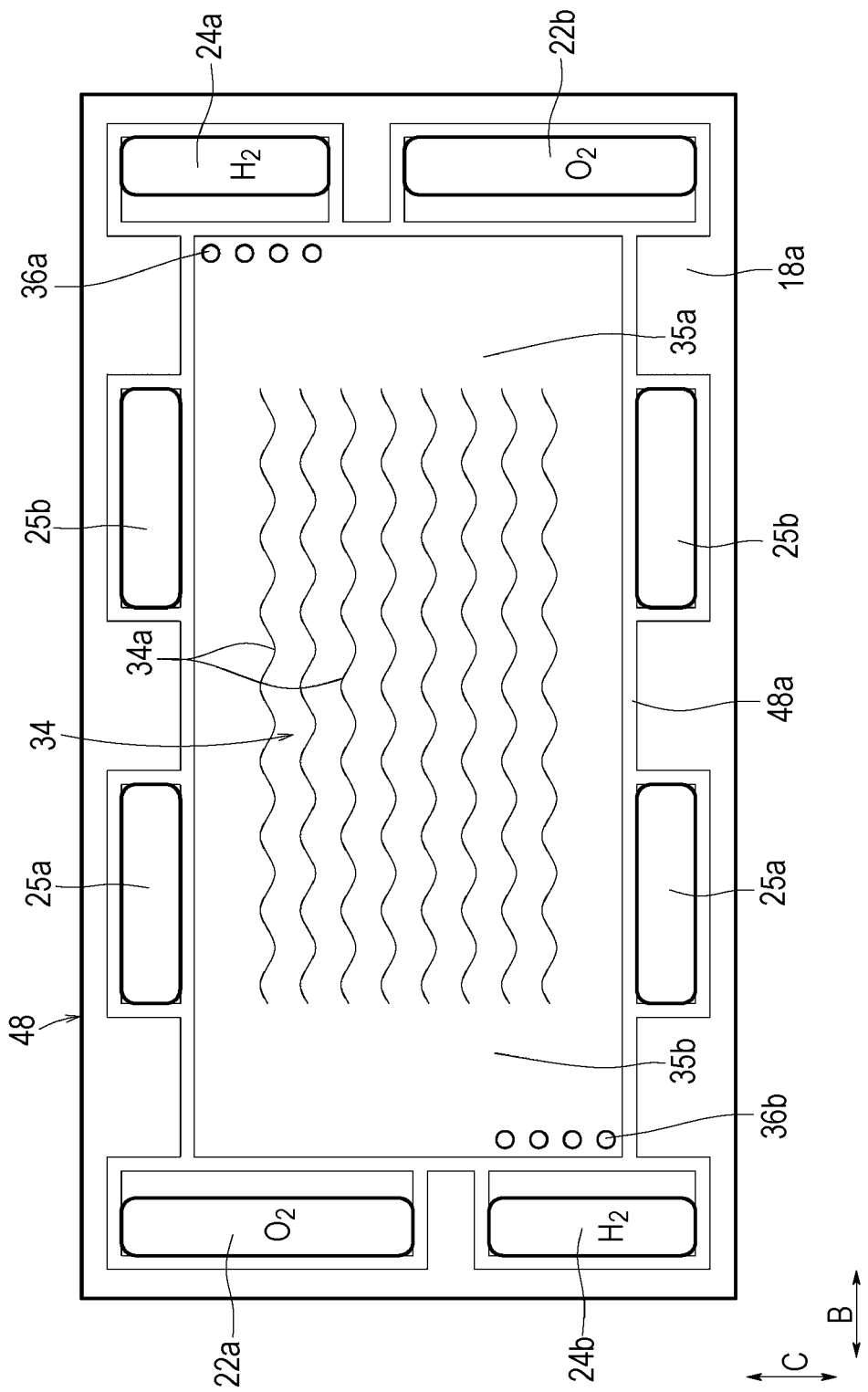
FIG. 7 illustrates one surface of a second metal separator of the power generation unit.

As illustrated in FIG. 7, a first fuel gas channel 34, through which the fuel gas inlet manifold 24a and the fuel gas outlet manifold 24b are connected to each other, is formed on a surface 18a of the second metal separator 18 facing the first membrane electrode assembly 16a. The first fuel gas channel 34 includes a plurality of wave-shaped (or linear) channel grooves 34a extending in the direction of arrow B.

Flat portions 35a and 35b are respectively formed on the upstream side and the downstream side of the first fuel gas channel 34 so as to face an inlet buffer portion 68a and an outlet buffer potion 68b described below. A plurality of supply holes 36a are formed in the vicinity of the fuel gas inlet manifold 24a, and a plurality of discharge holes 36b are formed in the vicinity of the fuel gas outlet manifold 24b.

Figure 8:
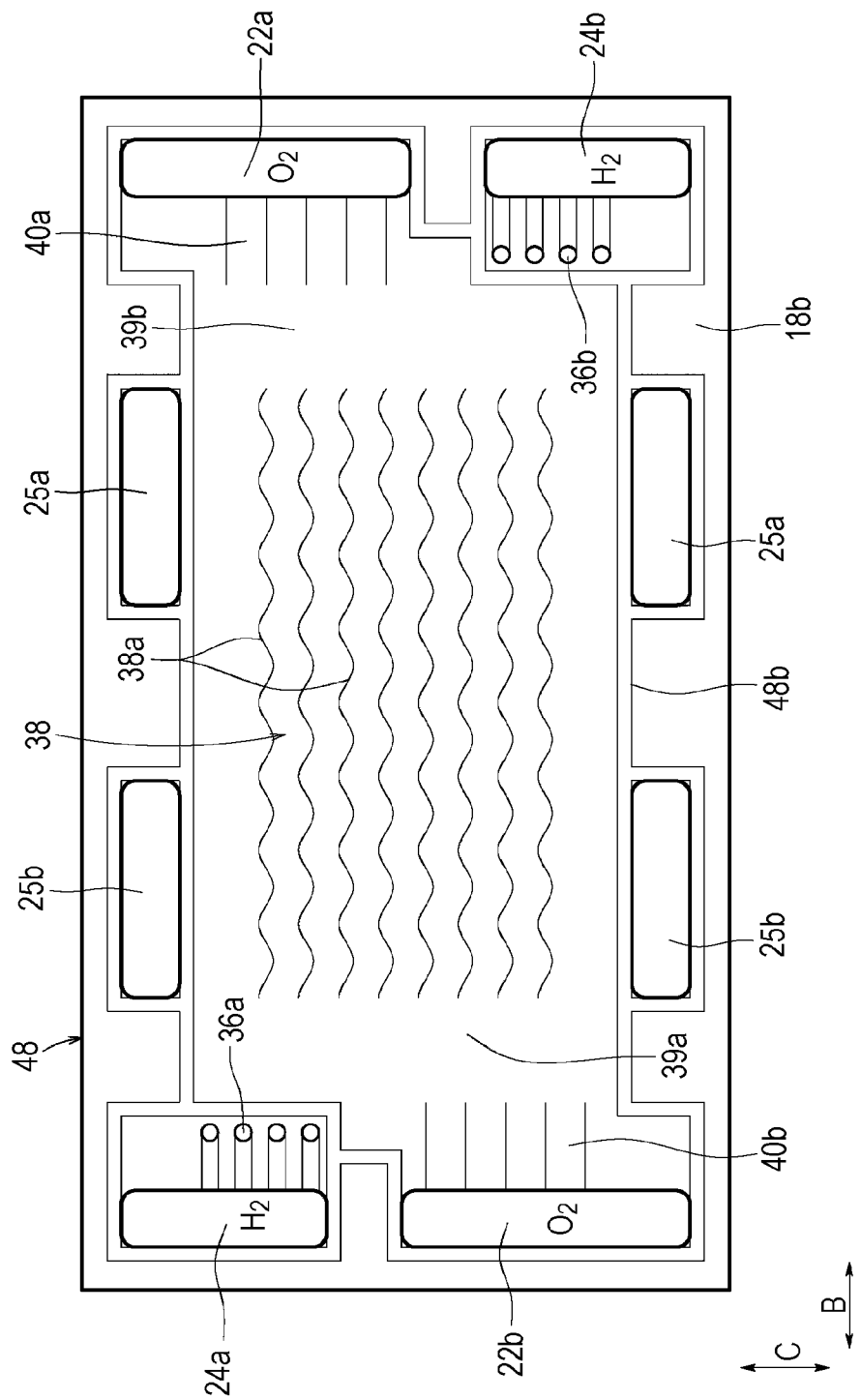
FIG. 8 illustrates the other surface of the second metal separator of the power generation unit.

As illustrated in FIG. 8, a second oxidant gas channel 38, through which the oxidant gas inlet manifold 22a and the oxidant gas outlet manifold 22b are connected to each other, is formed on a surface 18b of the second metal separator 18 facing the second membrane electrode assembly 16b. The second oxidant gas channel 38 includes a plurality of wave-shaped (or linear) channel grooves 38a extending in the direction of arrow B.

Flat portions 39a and 39b are respectively formed on the upstream side and the downstream side of the second oxidant gas channel 38 so as to face an inlet buffer portion 74a and an outlet buffer potion 74b described below. A plurality of inlet connection grooves 40a are formed in the vicinity of the oxidant gas inlet manifold 22a, and a plurality of outlet connection grooves 40b are formed in the vicinity of the oxidant gas outlet manifold 22b.

Figure 9:
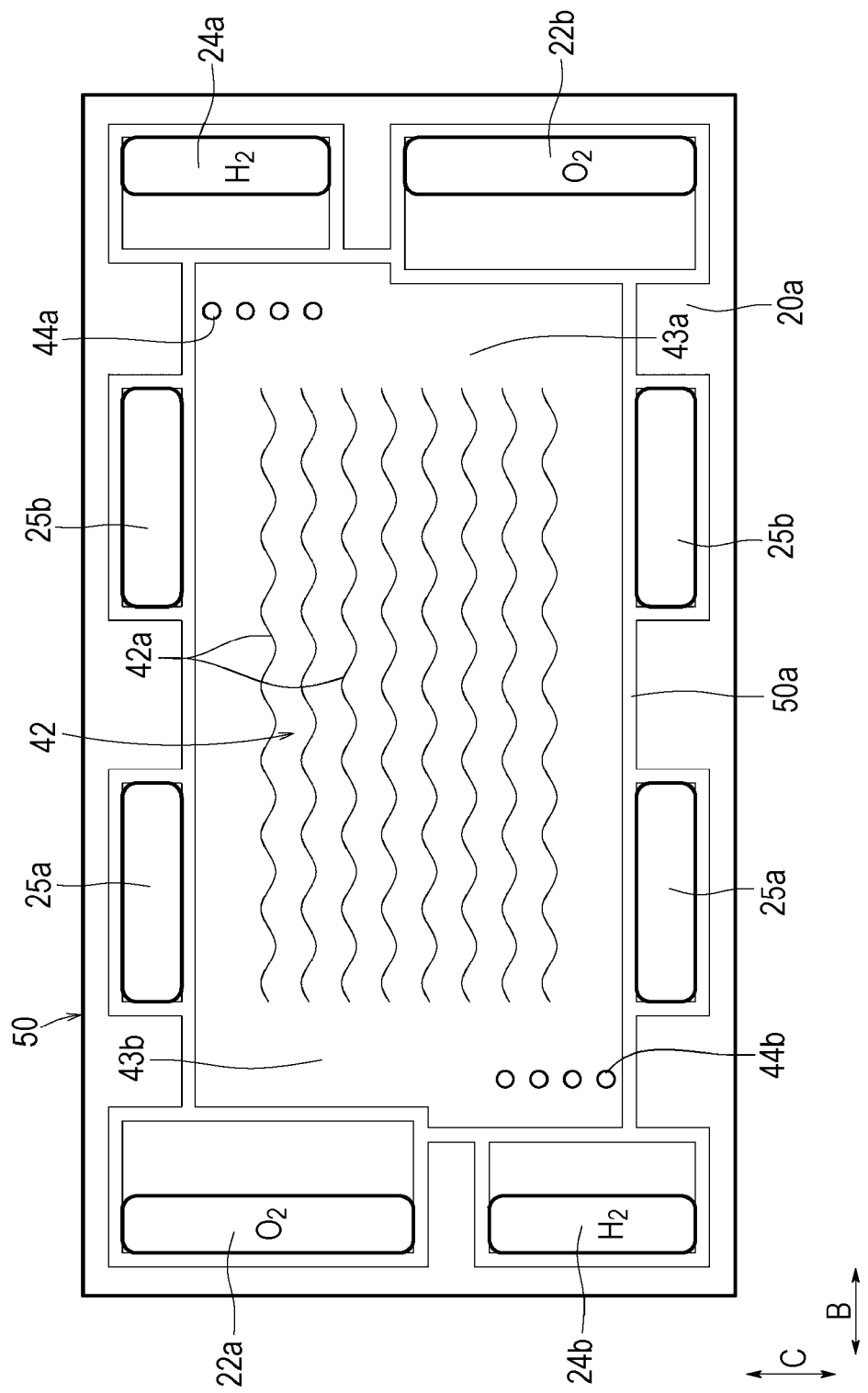
FIG. 9 illustrates one surface of a third metal separator of the power generation unit.

As illustrated in FIG. 9, the second fuel gas channel 42, through which the fuel gas inlet manifold 24a and the fuel gas outlet manifold 24b are connected to each other, is formed on a surface 20a of the third metal separator 20 facing the second membrane electrode assembly 16b. The second fuel gas channel 42 includes a plurality of wave-shaped (or linear) channel grooves 42a extending in the direction of arrow B.

Flat portions 43a and 43b are respectively formed on the upstream side and the downstream side of the second fuel gas channel 42 so as to face an inlet buffer portion 80a and an outlet buffer potion 80b described below. A plurality of supply holes 44a are formed in the vicinity of the fuel gas inlet manifold 24a, and a plurality discharge holes 44b are formed in the vicinity of the fuel gas outlet manifold 24b.

Figure 3:
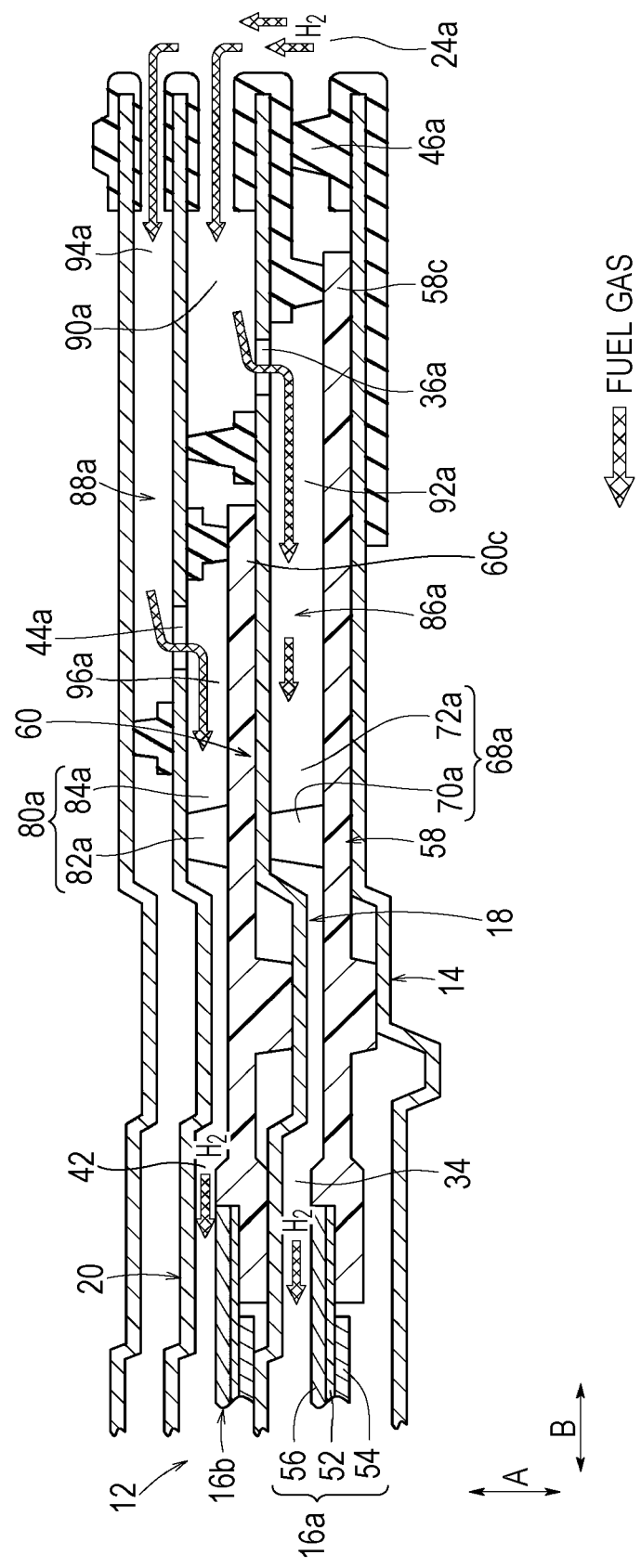
FIG. 3 is a sectional view of the power generation unit taken along line III-III of FIG. 1.
Figure 4:
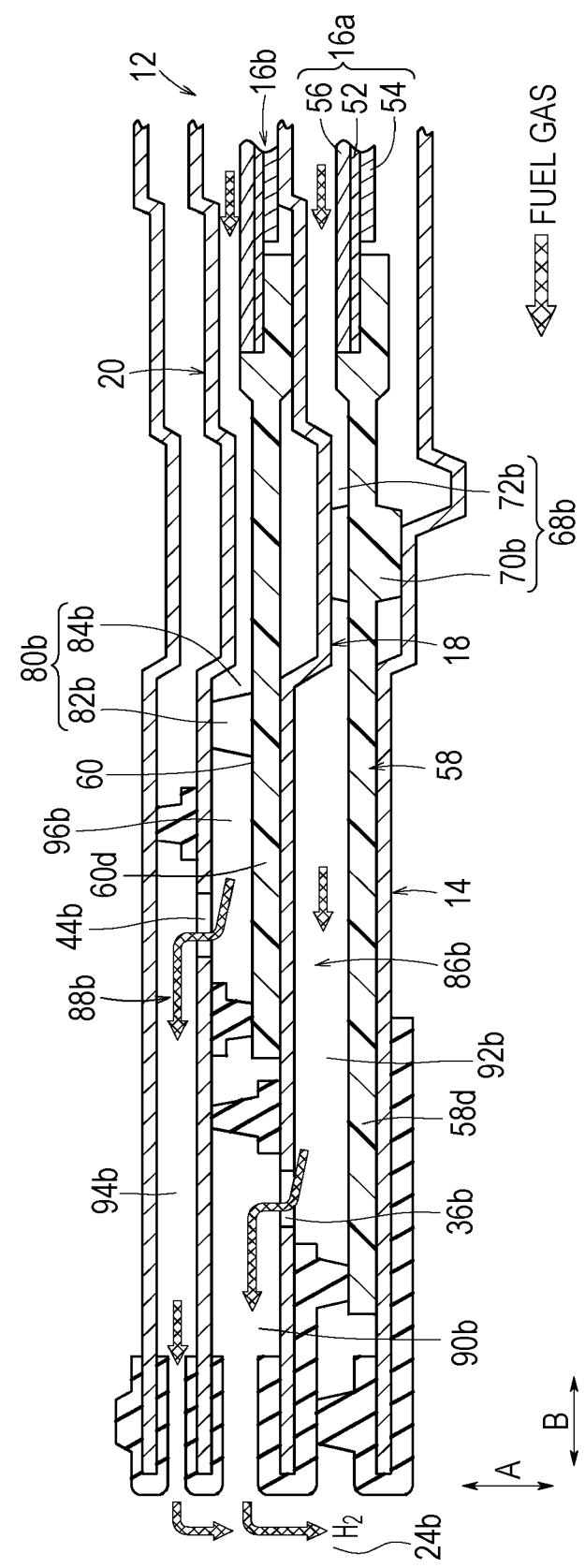
FIG. 4 is a sectional view of the power generation unit taken along line IV-IV of FIG. 1.

As illustrated in FIG. 3, the supply holes 44a are disposed inward from the supply holes 36a of the second metal separator 18 (toward the fuel gas channel). As illustrated in FIG. 4, the discharge holes 44b are disposed inward from the discharge holes 36b of the second metal separator 18 (toward the fuel gas channel).

Figure 10:
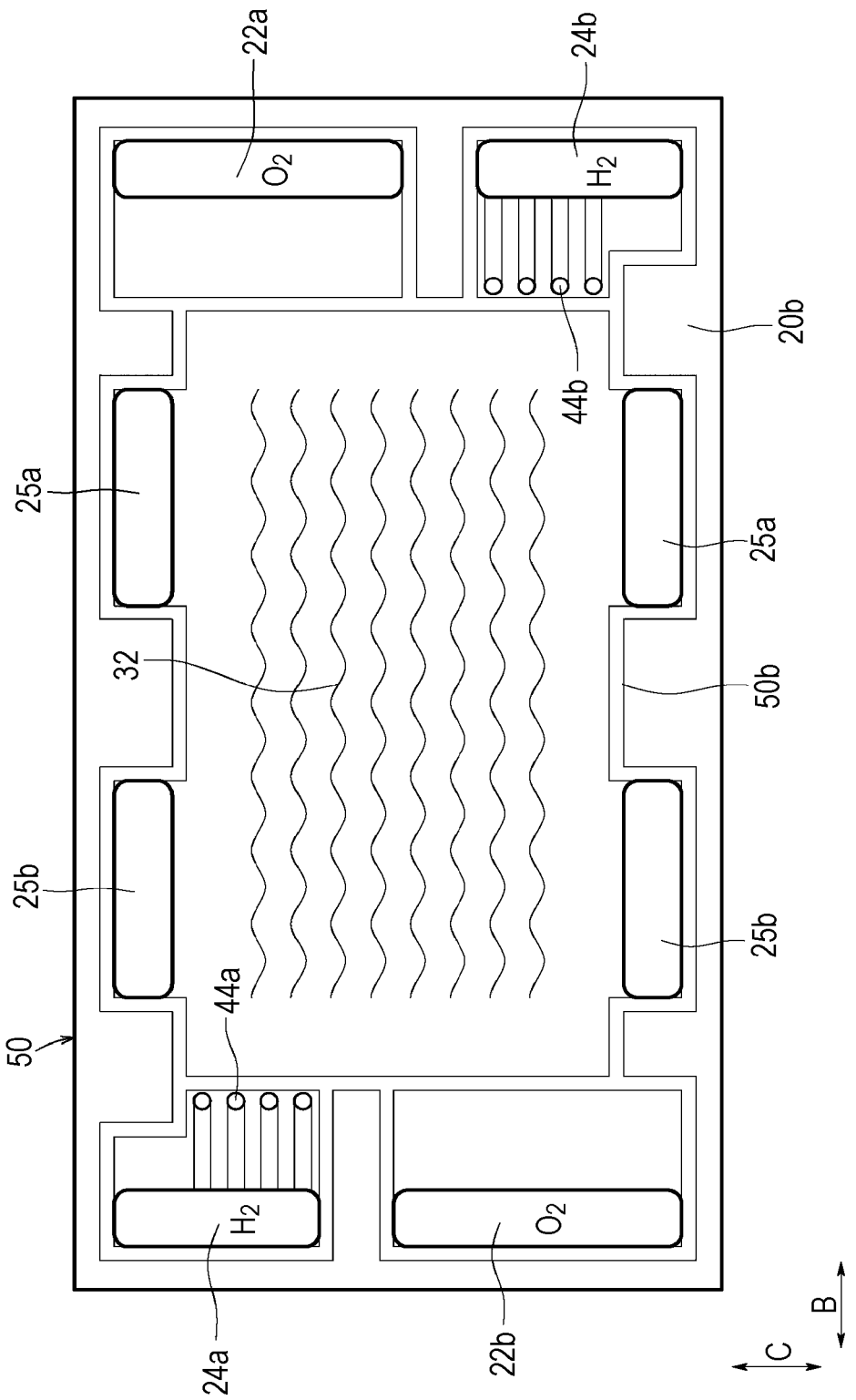
FIG. 10 illustrates the other surface of the third metal separator of the power generation unit.

As illustrated in FIG. 10, on a surface 20b of the third metal separator 20, a part of the coolant channel 32 is formed on the back side of the second fuel gas channel 42. The coolant channel 32 is integrally formed on the surface 20b of the third metal separator 20 when the surface 14b of the first metal separator 14 adjacent to the third metal separator 20 is superposed on the surface 20b.

As illustrated in FIG. 1, on the surfaces 14a and 14b of the first metal separator 14, a first sealing member 46 is integrally formed around the outer periphery of the first metal separator 14. On the surfaces 18a and 18b of the second metal separator 18, a second sealing member 48 is integrally formed around the outer periphery of the second metal separator 18. On the surfaces 20a and 20b of the third metal separator 20, a third sealing member 50 is integrally formed around the outer periphery of the third metal separator 20.

Each of the first sealing member 46, the second sealing member 48, and the third sealing member 50 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 6, the first sealing member 46 includes a first protruding sealing portion 46a on the surface 14a of the first metal separator 14. The first protruding sealing portion 46a makes the oxidant gas inlet manifold 22a and the oxidant gas outlet manifold 22b be connected to the first oxidant gas channel 26. As illustrated in FIG. 1, the first sealing member 46 includes a second protruding sealing portion 46b on the surface 14b of the first metal separator 14. The second protruding sealing portion 46b makes the coolant inlet manifolds 25a and the coolant outlet manifolds 25b be connected to the outer periphery of the coolant channel 32.

As illustrated in FIG. 7, the second sealing member 48 includes a first protruding sealing portion 48a on the surface 18a of the second metal separator 18. The first protruding sealing portion 48a surrounds the supply holes 36a, the discharge holes 36b, and the first fuel gas channel 34; and makes these be connected to each other.

As illustrated in FIG. 8, the second sealing member 48 includes a second protruding sealing portion 48b on the surface 18b of the second metal separator 18. The second protruding sealing portion 48b makes the oxidant gas inlet manifold 22a and the oxidant gas outlet manifold 22b be connected to the outer periphery of the second oxidant gas channel 38.

As illustrated in FIG. 9, the third sealing member 50 includes a first protruding sealing portion 50a on the surface 20a of the third metal separator 20. The first protruding sealing portion 50a surrounds the supply holes 44a, the discharge holes 44b, and the second fuel gas channel 42; and makes these be connected to each other.

As illustrated in FIG. 10, the third sealing member 50 includes a second protruding sealing portion 50b on the surface 20b of the third metal separator 20. The second protruding sealing portion 50b makes the coolant inlet manifolds 25a and the coolant outlet manifolds 25b be connected to the outer periphery of the coolant channel 32.

Figure 2:
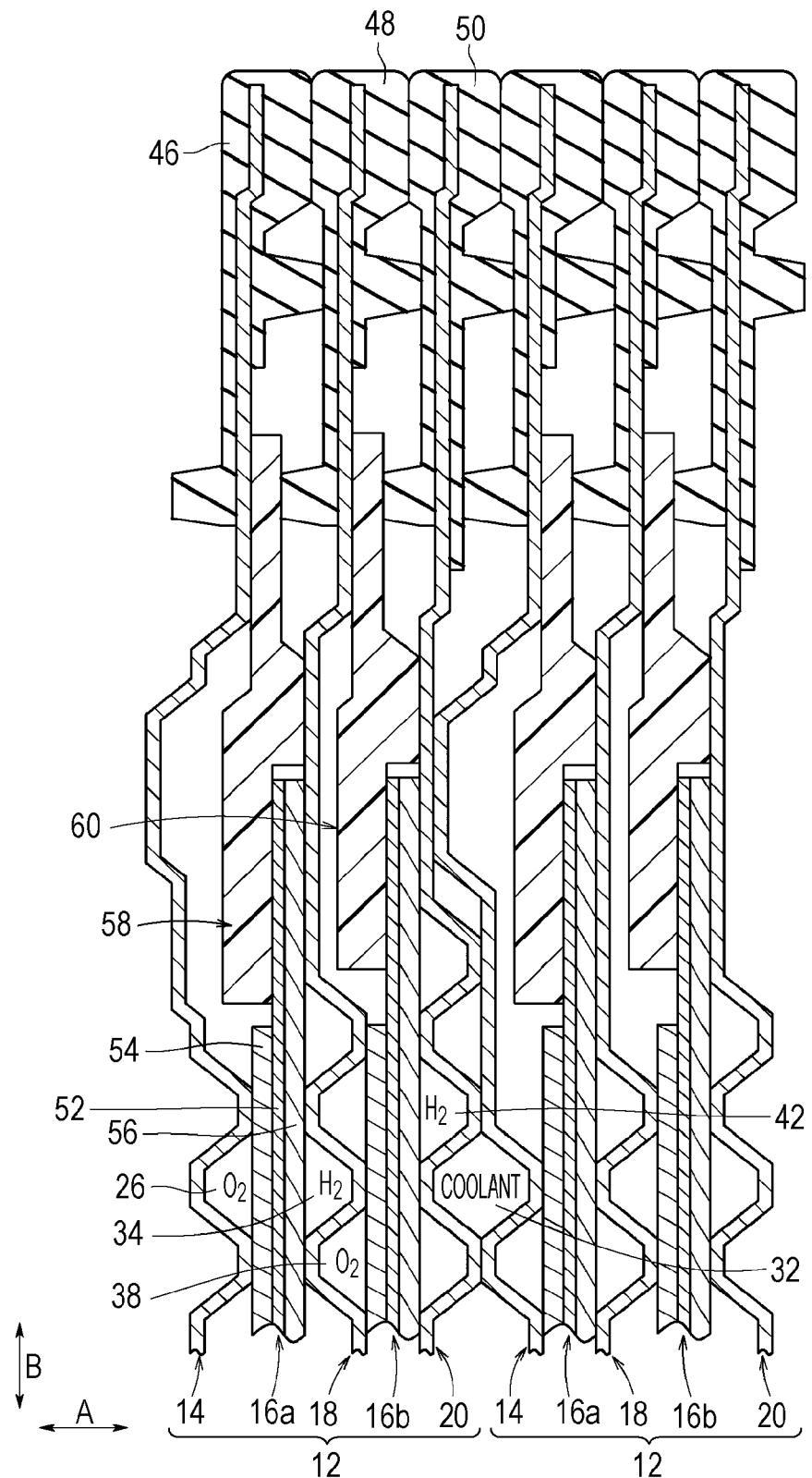
FIG. 2 is a sectional view of the power generation unit taken along line II-II of FIG. 1.

As illustrated in FIG. 2, each of the first membrane electrode assembly 16a and the second membrane electrode assembly 16b includes a solid polymer electrolyte membrane 52, and a cathode electrode 54 and an anode electrode 56 sandwiching the solid polymer electrolyte membrane 52 therebetween. The solid polymer electrolyte membrane 52 is, for example, a thin film made of a perfluorosulfonate polymer that is impregnated with water. Each of the first and second membrane electrode assemblies 16a and 16b is a so-called stepped MEA, in which the cathode electrode 54 has a surface area (planar dimensions) smaller than that of each of the anode electrode 56 and the solid polymer electrolyte membrane 52. Alternatively, the cathode electrode 54, the anode electrode 56, and the solid polymer electrolyte membrane 52 may have the same surface area. As a further alternative, the anode electrode 56 may have a surface area smaller than that of each of the cathode electrode 54 and the solid polymer electrolyte membrane 52.

Each of the cathode electrode 54 and the anode electrode 56 includes a gas diffusion layer (not shown) and an electrode catalyst layer (not shown). The gas diffusion layer is made of carbon paper or the like. The electrode catalyst layer is formed on a surface of the gas diffusion layer by uniformly coating the surface with porous carbon particles whose surfaces support a platinum alloy. Electrode catalyst layers are formed on both sides of the solid polymer electrolyte membrane 52.

A first resin frame member 58 is disposed on an outer periphery of the solid polymer electrolyte membrane 52 so as to be located outward from an edge of the cathode electrode 54 of the first membrane electrode assembly 16a. The first resin frame member 58 is integrally formed, for example, by injection molding. A second resin frame member 60 is disposed on an outer periphery of the solid polymer electrolyte membrane 52 so as to be located outward from an edge of the cathode electrode 54 of second membrane electrode assembly 16b. The second resin frame member 60 is integrally formed, for example, by injection molding. A commodity plastic, an engineering plastic, a super engineering plastic, or the like may be used as the resin material of the first resin frame member 58 and the second resin frame member 60.

Figure 11:
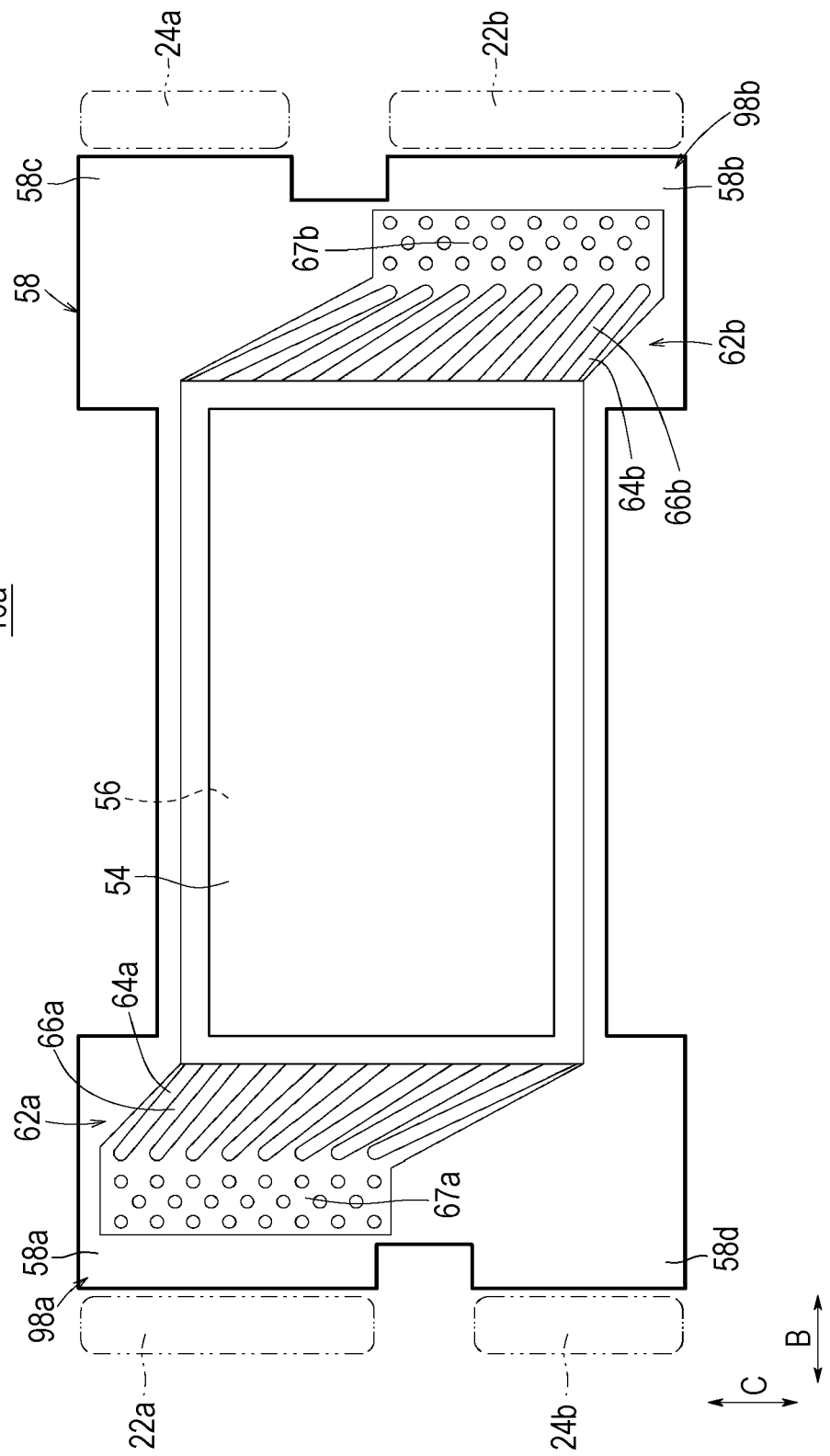
FIG. 11 illustrates one surface of a first membrane electrode assembly of the power generation unit.
Figure 12:
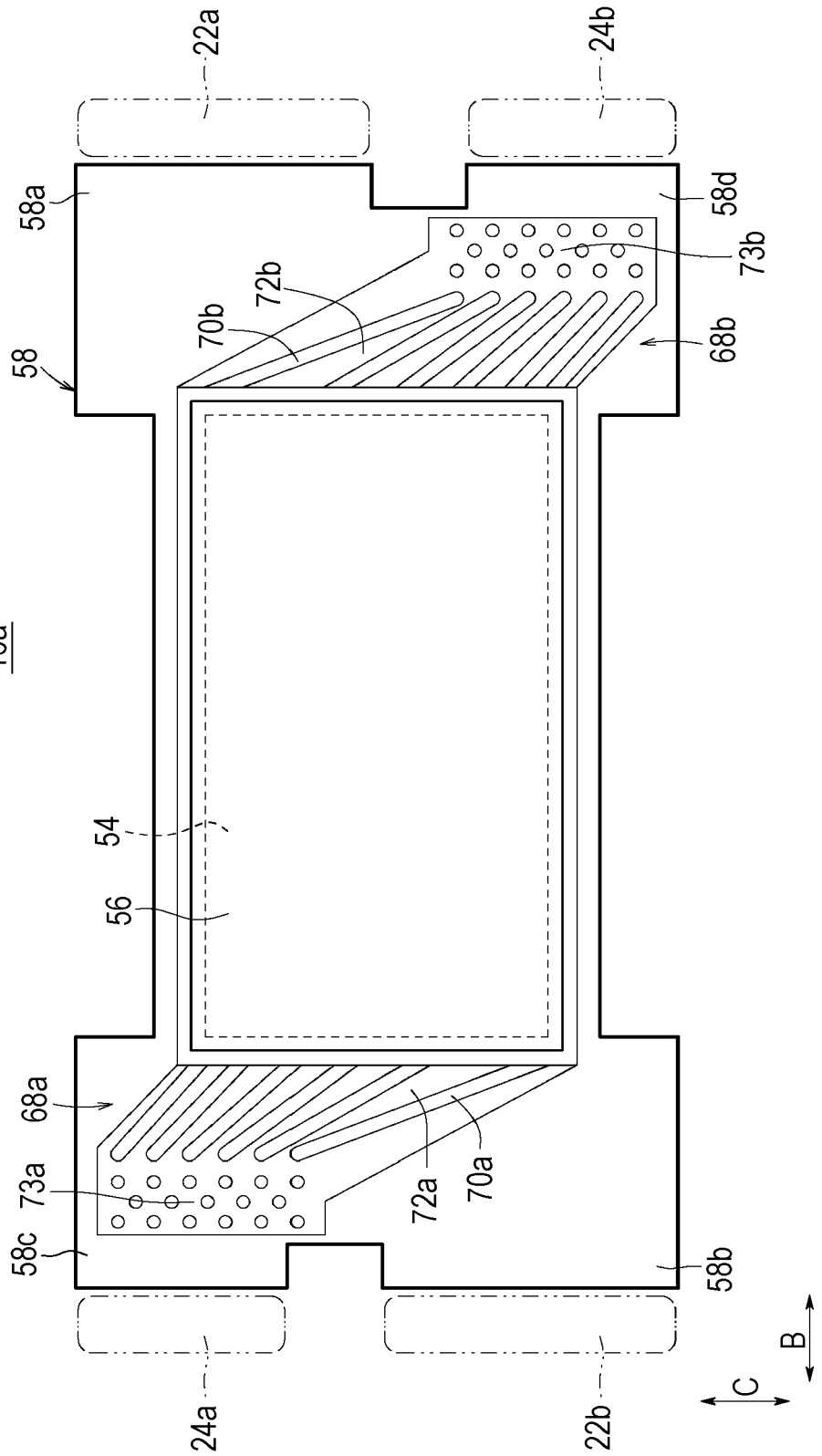
FIG. 12 illustrates the other surface of the first membrane electrode assembly of the power generation unit.

As illustrated in FIGS. 11 and 12, the first resin frame member 58 includes protruding portions 58a, 58b, 58c, and 58d at ends thereof in the longitudinal direction (direction of arrow B). The protruding portions 58a and 58b respectively protrude toward the oxidant gas inlet manifold 22a and the oxidant gas outlet manifold 22b. The protruding portions 58c and 58d respectively protrude toward the fuel gas inlet manifold 24a and the fuel gas outlet manifold 24b.

As illustrated in FIG. 11, on a surface of the first resin frame member 58 on the cathode electrode 54 side, an inlet buffer portion (oxidant-gas-side buffer portion) 62a, which corresponds a first buffer portion, is disposed between the oxidant gas inlet manifold 22a and the inlet side of the first oxidant gas channel 26. An outlet buffer potion (oxidant-gas-side buffer portion) 62b is disposed between the oxidant gas outlet manifold 22b and the outlet side of the first oxidant gas channel 26.

The inlet buffer portion 62a includes a plurality of linear protrusions 64a, which are integrally formed with the first resin frame member 58. Cathode-side inlet guide channels 66a are formed between the linear protrusions 64a. The outlet buffer potion 62b includes a plurality of linear protrusions 64b, which are integrally formed with the first resin frame member 58. Cathode-side outlet guide channels 66b are formed between the linear protrusions 64b. Embossed portions 67a and 67b are respectively formed on the inlet buffer portion 62a and the outlet buffer potion 62b so as to be adjacent to the oxidant gas inlet manifold 22a and the oxidant gas outlet manifold 22b.

The shapes of the inlet buffer portion 62a and the outlet buffer potion 62b are not limited to those described above. The inlet and outlet buffer portions 62a and 62b may have any shapes as long as the buffer portions 62a and 62b can be respectively disposed between the oxidant gas inlet manifold 22a and the first oxidant gas channel 26 and between the oxidant gas outlet manifold 22b and the first oxidant gas channel 26 and the buffer portions 62a and 62b can make the oxidant gas uniformly flow through the first oxidant gas channel 26.

The shapes of the linear protrusions 64a and 64b and the embossed portions 67a and 67b may be changed in various ways. For example, the embossed portions 67a may be disposed between the linear protrusions 64a. The same applies to the inlet buffer portion 68a and the outlet buffer potion 68b described below.

As illustrated in FIG. 12, on a surface of the first resin frame member 58 on the anode electrode 56 side, the inlet buffer portion (fuel-gas-side buffer portion) 68a, which corresponds to a second buffer portion, is disposed between the fuel gas inlet manifold 24a and the first fuel gas channel 34. The outlet buffer potion (fuel-gas-side buffer portion) 68b is disposed between the fuel gas outlet manifold 24b and the first fuel gas channel 34.

The inlet buffer portion 68a includes a plurality of linear protrusions 70a. Anode-side inlet guide channels 72a are formed between the linear protrusions 70a. The outlet buffer potion 68b includes a plurality of linear protrusions 70b. Anode-side outlet guide channels 72b are formed between the linear protrusions 70b. Embossed portions 73a and 73b are respectively formed on the inlet buffer portion 68a and the outlet buffer potion 68b so as to be adjacent to the fuel gas inlet manifold 24a and the fuel gas outlet manifold 24b.

Figure 13:
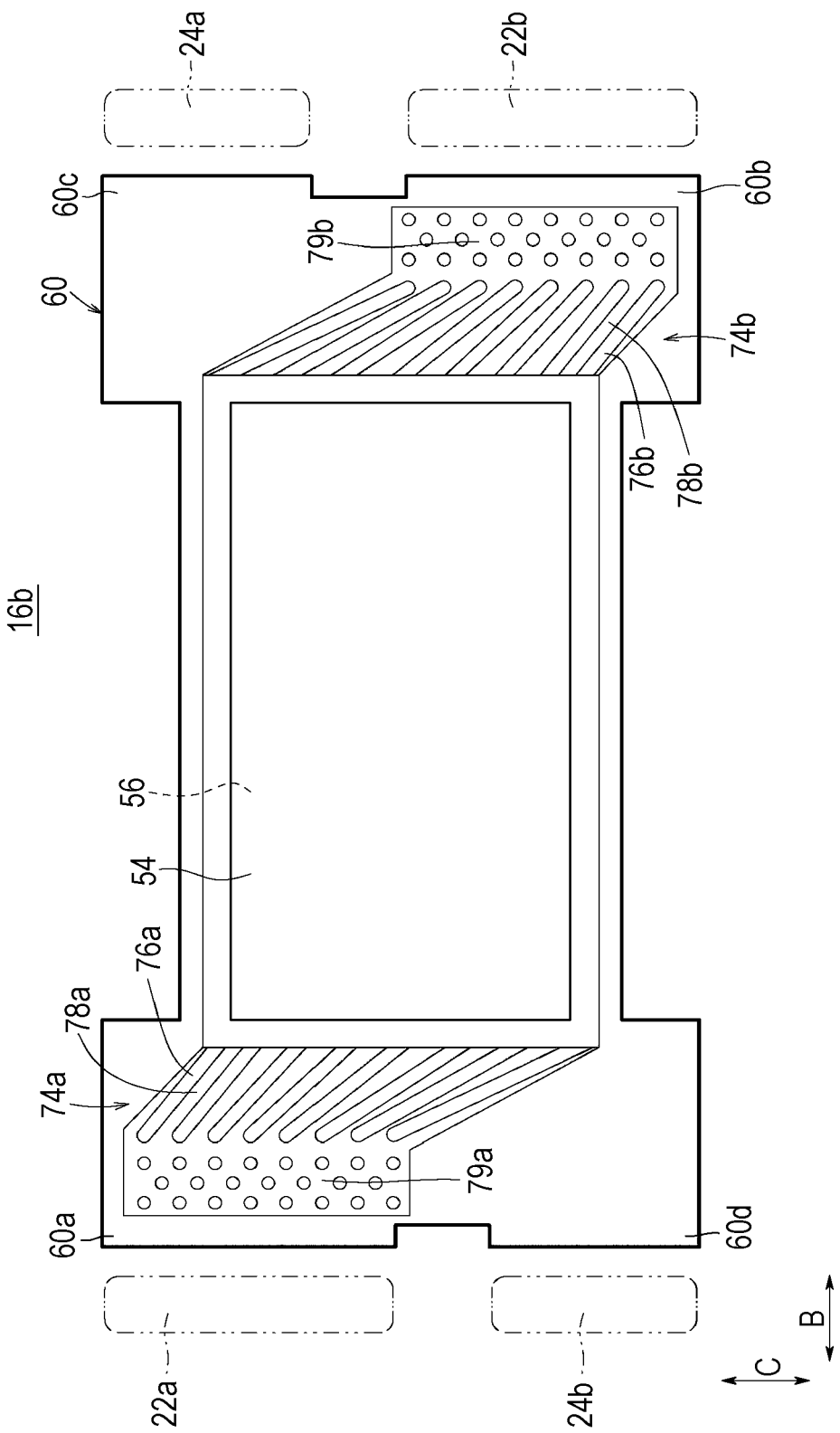
FIG. 13 illustrates one surface of a second membrane electrode assembly of the power generation unit.
Figure 14:
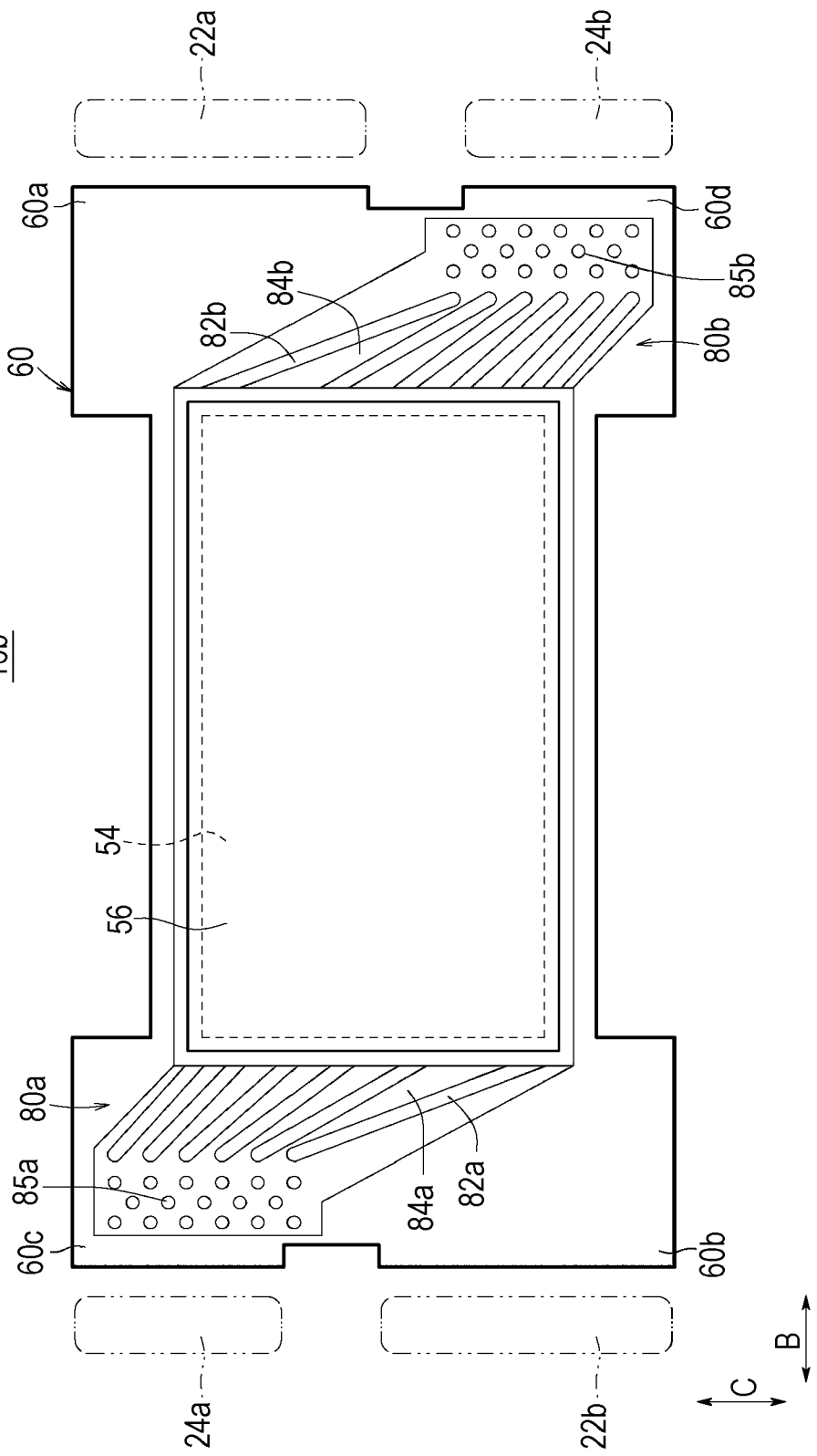
FIG. 14 illustrates the other surface of the second membrane electrode assembly of the power generation unit.

As illustrated in FIGS. 13 and 14, the second resin frame member 60 of the second membrane electrode assembly 16b includes protruding portions 60a, 60b, 60c, and 60d, which respectively protrude toward the oxidant gas inlet manifold 22a, the oxidant gas outlet manifold 22b, the fuel gas inlet manifold 24a, and the fuel gas outlet manifold 24b.

As illustrated in FIG. 13, on a surface of the second resin frame member 60 on the cathode electrode 54 side, the inlet buffer portion (oxidant-gas-side buffer portion) 74a, which corresponds to a first buffer portion, is disposed between the oxidant gas inlet manifold 22a and the second oxidant gas channel 38. The outlet buffer potion (oxidant-gas-side buffer portion) 74b is disposed between the oxidant gas outlet manifold 22b and the second oxidant gas channel 38.

The inlet buffer portion 74a includes a plurality of linear protrusions 76a. Cathode-side inlet guide channels 78a are formed between the linear protrusions 76a. The outlet buffer potion 74b includes a plurality of linear protrusions 76b. Cathode-side outlet guide channels 78b are formed between the linear protrusions 76b. Embossed portions 79a and 79b are respectively formed on the inlet buffer portion 74a and the outlet buffer potion 74b so as to be adjacent to the oxidant gas inlet manifold 22a and the oxidant gas outlet manifold 22b.

The shapes of the inlet buffer portion 74a and the outlet buffer potion 74b are not limited to those described above. The inlet and outlet buffer portions 74a and 74b may have any shapes as long as the buffer portions 74a and 74b can be respectively disposed between the oxidant gas inlet manifold 22a and the second oxidant gas channel 38 and between the oxidant gas outlet manifold 22b and the second oxidant gas channel 38 and the buffer portions 74a and 74b can make the oxidant gas uniformly flow through to the second oxidant gas channel 38.

The shapes of the linear protrusions 76a and 76b and the embossed portions 79a and 79b may be changed in various ways. For example, the embossed portions 79a may be disposed between the linear protrusions 76a. The same applies to the inlet buffer portion 80a and the outlet buffer potion 80b described below.

As illustrated in FIG. 14, on a surface of the second resin frame member 60 on the anode electrode 56 side, the inlet buffer portion (fuel-gas-side buffer portion) 80a, which corresponds to a second buffer portion, is disposed between the fuel gas inlet manifold 24a and the second fuel gas channel 42. The outlet buffer potion (fuel-gas-side buffer portion) 80b is disposed between the fuel gas outlet manifold 24b and the second fuel gas channel 42.

The inlet buffer portion 80a includes a plurality of linear protrusions 82a. Anode-side inlet guide channels 84a are formed between the linear protrusions 82a. The outlet buffer potion 80b includes a plurality of linear protrusions 82b. Anode-side outlet guide channels 84b are formed between the linear protrusions 82b. Embossed portions 85a and 85b are respectively formed on the inlet buffer portion 80a and the outlet buffer potion 80b so as to be adjacent to the fuel gas inlet manifold 24a and the fuel gas outlet manifold 24b.

As illustrated in FIG. 3, the fuel gas inlet manifold 24a is connected to the first fuel gas channel 34 through an inlet connection channel 86a and the inlet buffer portion 68a. The fuel gas inlet manifold 24a is connected to the second fuel gas channel 42 through an inlet connection channel 88a and the inlet buffer portion 80a.

The inlet connection channel 86a is disposed between the fuel gas inlet manifold 24a and the inlet buffer portion 68a. The inlet connection channel 86a includes a first channel portion 90a, the supply holes 36a, and a second channel portion 92a. The first channel portion 90a is formed between the second metal separator 18 and the third metal separator 20, which are disposed adjacent to each other. One end of the first channel portion 90a is connected to the fuel gas inlet manifold 24a. The supply holes 36a are formed in the second metal separator 18 and connected to the other end of the first channel portion 90a. The second channel portion 92a is formed between the second metal separator 18 and the protruding portion 58c of the first resin frame member 58. One end of the second channel portion 92a is connected to the supply holes 36a, and the other end of the second channel portion 92a is connected to the inlet buffer portion 68a.

Likewise, the inlet connection channel 88a includes a first channel portion 94a, the supply holes 44a, and a second channel portion 96a. The first channel portion 94a is formed between the third metal separator 20 and the first metal separator 14, which are disposed adjacent to each other. One end of the first channel portion 94a is connected t to the fuel gas inlet manifold 24a. The supply holes 44a are formed in the third metal separator 20 and connected to the other end of the first channel portion 94a. The second channel portion 96a is formed between the third metal separator 20 and the protruding portion 60c of the second resin frame member 60. One end of the second channel portion 96a is connected to the supply holes 44a, and the other end of the second channel portion 96a is connected to the inlet buffer portion 80a.

As illustrated in FIG. 4, the fuel gas outlet manifold 24b is connected to the outlet buffer potion 68b through an outlet connection channel 86b. The fuel gas outlet manifold 24b is connected to the outlet buffer potion 80b through an outlet connection channel 88b. The outlet connection channel 86b includes a first channel portion 90b formed between the second metal separator 18 and the third metal separator 20, the discharge holes 36b formed in the second metal separator 18, and a second channel portion 92b formed between the second metal separator 18 and the protruding portion 58d of the first resin frame member 58.

The outlet connection channel 88b includes a first channel portion 94b formed between the third metal separator 20 and the first metal separator 14 adjacent to the third metal separator 20, the discharge holes 44b formed in the third metal separator 20, and a second channel portion 96b formed between the third metal separator 20 and the protruding portion 60d of the second resin frame member 60.

Figure 5:
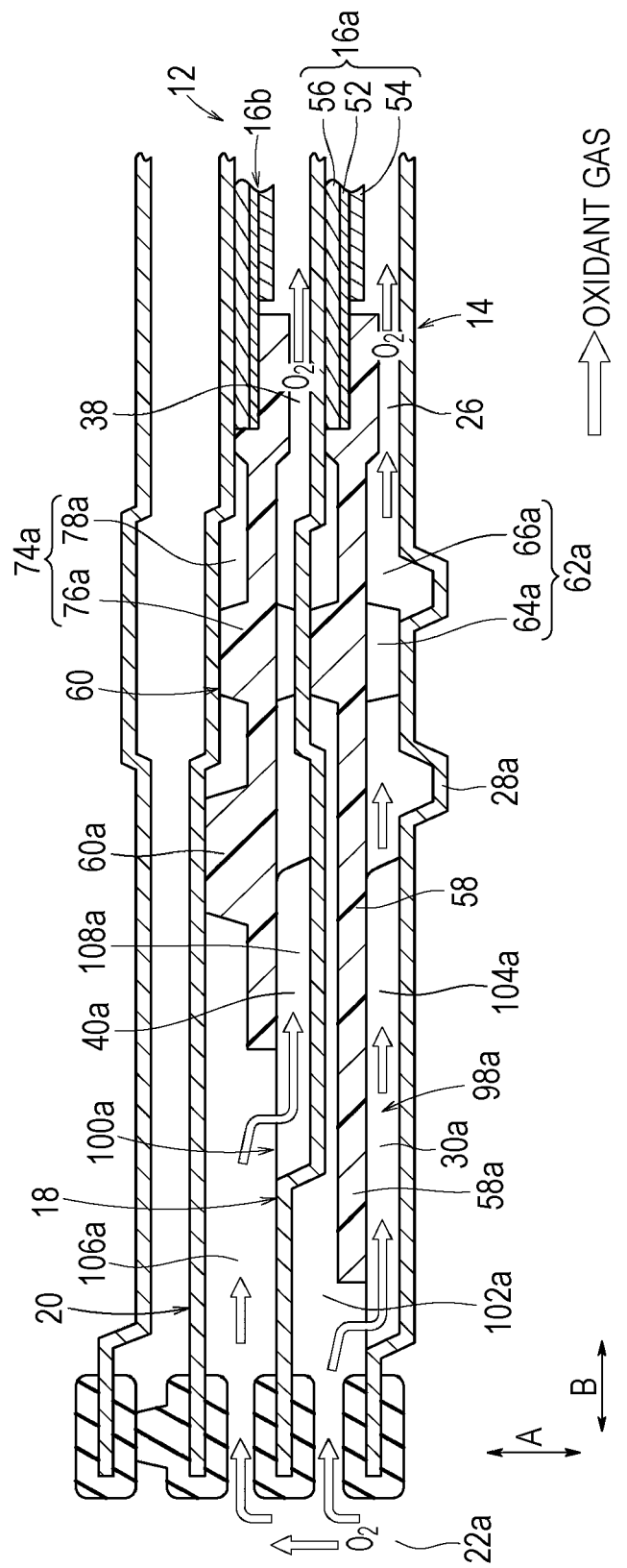
FIG. 5 is a sectional view of the power generation unit taken along line V-V of FIG. 1.

As illustrated in FIG. 5, the oxidant gas inlet manifold 22a is connected to the inlet buffer portion 62a through an inlet connection channel 98a. The oxidant gas inlet manifold 22a is connected to the inlet buffer portion 74a through an inlet connection channel 100a.

The inlet connection channel 98a includes a first channel portion 102a and a second channel portion 104a. The first channel portion 102a is formed between the first metal separator 14 and the second metal separator 18. One end of the first channel portion 102a is connected to the oxidant gas inlet manifold 22a. The second channel portion 104a is formed between the first metal separator 14 and the protruding portion 58a of the first resin frame member 58. One end of the second channel portion 104a is connected to the first channel portion 102a, and the other end of the second channel portion 104a is connected to the inlet buffer portion 62a.

The inlet connection channel 100a includes a first channel portion 106a and a second channel portion 108a. The first channel portion 106a is formed between the second metal separator 18 and the third metal separator 20. One end of the first channel portion 106a is connected to the oxidant gas inlet manifold 22a. The second channel portion 108a is formed between the second metal separator 18 and the protruding portion 60a of the second resin frame member 60. One end of the second channel portion 108a is connected to the first channel portion 106a, and the other end of the second channel portion 108a is connected to the inlet buffer portion 74a.

Likewise, outlet connection channels 98b and 100b are respectively formed between the oxidant gas outlet manifold 22b and the outlet buffer potion 62b and between the oxidant gas outlet manifold 22b and the outlet buffer portion 74b. Detailed description of the outlet connection channels 98b and 100b will be omitted.

When two power generation units 12 are stacked on top of each other, the coolant channel 32 is formed between the first metal separator 14 of one of the power generation units 12 and the third metal separator 20 of the other power generation unit 12.

The operation of the fuel cell 10 will be described below.

First, as illustrated in FIG. 1, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or the like, is supplied to the coolant inlet manifolds 25a.

As illustrated in FIG. 5, the oxidant gas is introduced into the inlet connection channels 98a and 100a from the oxidant gas inlet manifold 22a. The oxidant gas introduced into the inlet connection channel 98a is supplied to the first oxidant gas channel 26 of the first metal separator 14 through the inlet buffer portion 62a. The oxidant gas introduced into the inlet connection channel 100a is supplied to the second oxidant gas channel 38 of the second metal separator 18 through the inlet buffer portion 74a.

As illustrated in FIGS. 1, 6, and 8, the oxidant gas supplied to the first oxidant gas channel 26 flows in the direction of arrow B (horizontal direction) along the first oxidant gas channel 26, and is supplied to the cathode electrode 54 of the first membrane electrode assembly 16a; and the oxidant gas supplied to the second oxidant gas channel 38 flows in the direction of arrow B along the second oxidant gas channel 38, and is supplied to the cathode electrode 54 of the second membrane electrode assembly 16b.

As illustrated in FIG. 3, a fuel gas is introduced into the inlet connection channels 86a and 88a through the fuel gas inlet manifold 24a. In the inlet connection channel 86a, the fuel gas flows to the second channel portion 92a through the first channel portion 90a and the supply holes 36a, and is supplied to the inlet buffer portion 68a. The fuel gas is supplied to the first fuel gas channel 34 of the second metal separator 18 through the inlet buffer portion 68a.

In the inlet connection channel 88a, the fuel gas flows to the second channel portion 96a through the first channel portion 94a and the supply holes 44a, and is supplied to the inlet buffer portion 80a. The fuel gas is supplied to the second fuel gas channel 42 of the third metal separator 20 through the inlet buffer portion 80a.

As illustrated in FIGS. 1, 7, and 9, the fuel gas supplied to the first fuel gas channel 34 flows in the direction of arrow B along the first fuel gas channel 34, and is supplied to the anode electrode 56 of the first membrane electrode assembly 16a; and the fuel gas supplied to the second fuel gas channel 42 flows in the direction of arrow B along the second fuel gas channel 42, and is supplied to the anode electrode 56 of the second membrane electrode assembly 16b.

Accordingly, in each of the first membrane electrode assembly 16a and the second membrane electrode assembly 16b, the oxidant gas supplied to the cathode electrode 54 and the fuel gas supplied to the anode electrode 56 are consumed in electrochemical reactions in the electrode catalyst layers, and thereby electric power is generated.

The oxidant gas supplied to the cathode electrodes 54 of the first and second membrane electrode assemblies 16a and 16b is discharged to the oxidant gas outlet manifold 22b through the outlet buffer potions 62b and 74b and the outlet connection channels.

As illustrated in FIG. 4, the fuel gas supplied to the anode electrodes 56 of the first and second membrane electrode assemblies 16a and 16b is introduced into the outlet connection channels 86b and 88b through the outlet buffer potions 68b and 80b. In the outlet connection channel 86b, the fuel gas is supplied to the first channel portion 90b through the second channel portion 92b and the discharge holes 36b, and is discharged to the fuel gas outlet manifold 24b.

In the outlet connection channel 88b, the fuel gas is supplied to the first channel portion 94b through the second channel portion 96b and the discharge holes 44b, and is discharged to the fuel gas outlet manifold 24b.

As illustrated in FIG. 1, a coolant is supplied to the pair of coolant inlet manifolds 25a, and is introduced into the coolant channel 32. The coolant, which has been supplied to the coolant channel 32 through the coolant inlet manifolds 25a, temporarily flows inward in the direction of arrow C, then flows in the direction of arrow B, and cools the first membrane electrode assembly 16a and the second membrane electrode assembly 16b. Then, the coolant flows outward in the direction of arrow C, and is discharged to the pair of coolant outlet manifolds 25b.

In the first embodiment, for example, the first resin frame member 58 is formed on the outer periphery of the first membrane electrode assembly 16a. As illustrated in FIG. 11, on one surface of the first resin frame member 58, the inlet buffer portion 62a is formed between the oxidant gas inlet manifold 22a and the inlet side of the first oxidant gas channel 26. The outlet buffer potion 62b is formed between the oxidant gas outlet manifold 22b and the outlet side of the first oxidant gas channel 26.

Moreover, as illustrated in FIG. 12, on the other surface of the first resin frame member 58, the inlet buffer portion 68a is formed between the fuel gas inlet manifold 24a and the first fuel gas channel 34. The outlet buffer potion 68b is formed between the fuel gas outlet manifold 24b and the first fuel gas channel 34.

Accordingly, the inlet and outlet buffer portions 62a and 62b each having a desired shape and the inlet and outlet buffer portions 68a and 68b each having a desired shape can be individually formed on the two surfaces of the first resin frame member 58. Therefore, the oxidant gas and the fuel gas can smoothly flow through the first oxidant gas channel 26 and through the first fuel gas channel 34.

Thus, with the first embodiment, the oxidant gas can smoothly and uniform flow through the first oxidant gas channel 26, and the fuel gas cans smoothly and uniform flow through the first fuel gas channel 34 with a simple and economical structure.

The second membrane electrode assembly 16b has the same effect as that of the first membrane electrode assembly 16a.

Figure 15:
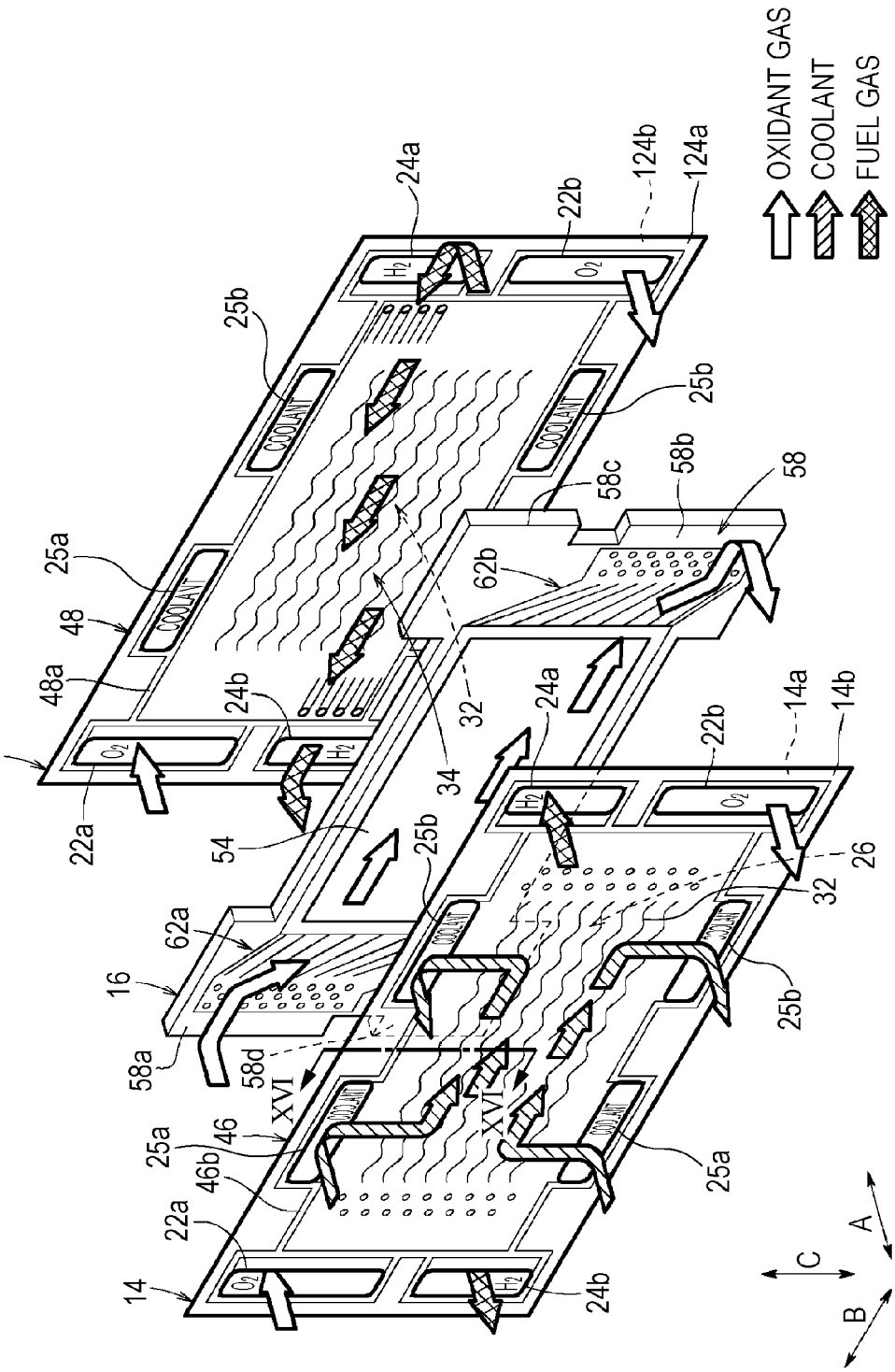
FIG. 15 is an exploded perspective view of a power generation unit of a fuel cell according to a second embodiment.
Figure 16:
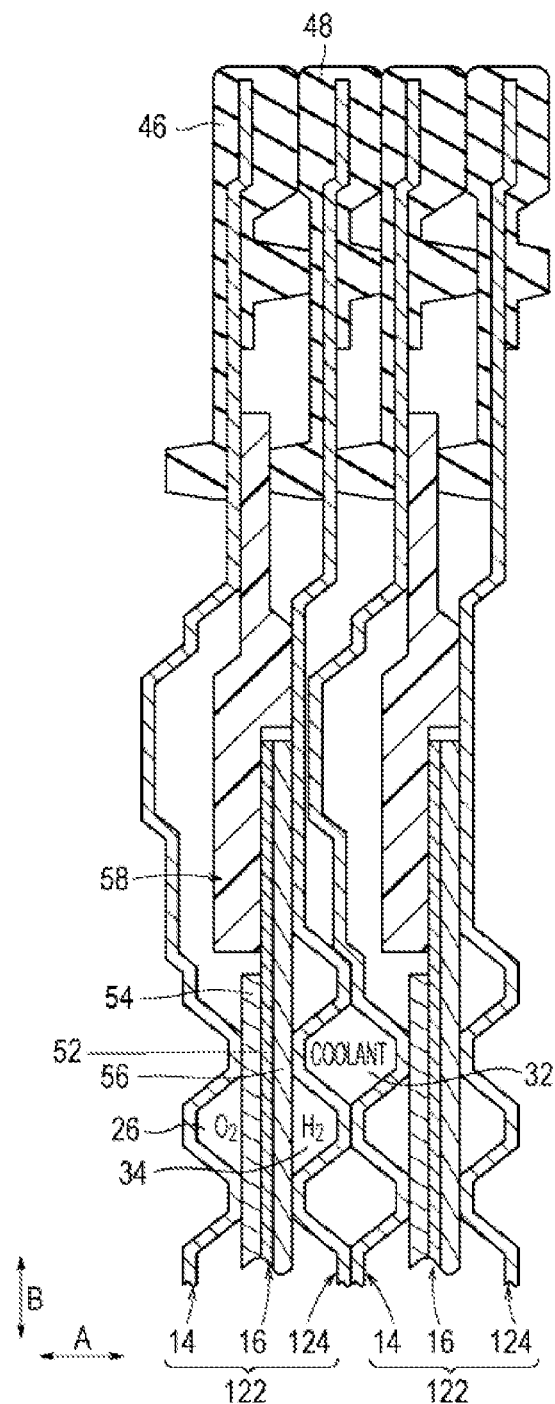
FIG. 16 is a sectional view of the power generation unit taken along line XVI-XVI of FIG. 15.

As illustrated in FIGS. 15 and 16, a fuel cell 120 according to a second embodiment includes a plurality of power generation units 122 that are stacked.

Each power generation unit 122 includes a membrane electrode assembly 16, and a first metal separator 14 and a second metal separator 124 sandwiching the membrane electrode assembly 16 therebetween. The elements the same as those of the fuel cell 10 according to the first embodiment will be denoted by the same numerals and detailed description thereof will be omitted.

A fuel gas channel 34 is formed on a surface 124a of the second metal separator 124 on the membrane electrode assembly 16 side. A part of the coolant channel 32 is formed on a surface 124b of the second metal separator 124. The membrane electrode assembly 16 has a structure the same as those of the first membrane electrode assembly 16a or the second membrane electrode assembly 16b of the first embodiment.

The second embodiment having such a structure includes the membrane electrode assembly 16, on which a first resin frame member 58 is formed, and has an effect the same as that of the first embodiment.

According to an aspect of the embodiment, a fuel cell includes a membrane electrode assembly including an electrolyte membrane and a pair of electrodes sandwiching the electrolyte membrane therebetween, and a pair of separators. The membrane electrode assembly and the separators are stacked in a stacking direction. Each of the separators includes a reactant gas channel through which a reactant gas is supplied along an electrode surface and includes a reactant gas manifold through which the reactant gas flows in the stacking direction. The membrane electrode assembly includes a resin frame member disposed on an outer periphery thereof.

In the fuel cell according to the embodiment, a first buffer portion is formed on one surface of the resin frame member, the first buffer portion being located outside of a power generation region and connected to one of the reactant gas channels, and a second buffer portion is formed on the other surface of the resin frame member, the second buffer portion being located outside of the power generation region and connected to the other reactant gas channel, the second buffer portion being independent from the first buffer portion.

In the fuel cell according to the embodiment, the reactant gas manifold may include an oxidant gas inlet manifold, a fuel gas inlet manifold, an oxidant gas outlet manifold, and a fuel gas outlet manifold, which are formed in corners of the separators. An oxidant-gas-side buffer portion, which is the first buffer portion, may include a plurality of cathode-side inlet guide channels and a plurality of cathode-side outlet guide channels, the cathode-side inlet guide channels extending from an oxidant gas channel, which is the one of reactant gas channels, toward the oxidant gas inlet manifold, the cathode-side outlet guide channels extending from the oxidant gas channel toward the oxidant gas outlet manifold.

It is preferable that a fuel-gas-side buffer portion, which is the second buffer portion, include a plurality of anode-side inlet guide channels and a plurality of anode-side outlet guide channels, the anode-side inlet guide channels extending from a fuel gas channel, which is the other reactant gas channel, toward the fuel gas outlet manifold, the anode-side outlet guide channels extending from the fuel gas channel toward the fuel gas outlet manifold.

In the fuel cell according to the embodiment, an embossed portion may be disposed between the cathode-side inlet guide channel and the oxidant gas inlet manifold, an embossed portion may be disposed between the cathode-side outlet guide channel and the oxidant gas outlet manifold, an embossed portion may be disposed between the anode-side inlet guide channel and the fuel gas inlet manifold, and an embossed portion may be disposed between the anode-side outlet guide channel and the fuel gas outlet manifold.

In the fuel cell according to the embodiment, it is preferable that the resin frame member have an external shape such that the resin frame member is disposed inward from the reactant gas manifold.

In the fuel cell according to the embodiment, it is preferable that a surface of one of the separators facing the first buffer portion be flat, and a surface of the other separator facing the second buffer portion be flat.

In the fuel cell according to the embodiment, it is preferable that a coolant channel along which a coolant flows in an in-plane direction of the electrodes be formed between a pair of the separators that are disposed adjacent to each other, and only one of the pair of the separators include a buffer portion that is located outside of the power generation region and through which the coolant channel is connected to a coolant manifold.

With the embodiment, a resin frame member is disposed on an outer periphery of a membrane electrode assembly. A first buffer portion, which is connected to one of reactant gas channels, is formed on one surface of the resin frame member. A second buffer portion, which is connected to the other reactant gas channel and is independent from the first buffer portion, is formed on the other surface of the resin frame member.

Accordingly, the first buffer portion and the second buffer portion, each having a desired shape, can be independently formed on the two surfaces of the resin frame member. Therefore, a reactant gas can smoothly flow through each of the one reactant gas channel and the other reactant gas channel. Thus, the reactant gases can smoothly and uniformly flow along the reactant gas channels with a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly including a first electrode, a second electrode, a resin frame member, and an electrolyte membrane provided between the first electrode and the second electrode in a stacking direction, the resin frame member being disposed on an outer periphery of the membrane electrode assembly;

a first separator; and a second separator, the membrane electrode assembly being provided between the first separator and the second separator in the stacking direction, each of the first and second separators including a reactant gas channel through which a reactant gas is to be supplied along an electrode surface of the membrane electrode assembly and a reactant gas manifold through which the reactant gas is to flow in the stacking direction, the resin frame member including a first surface, a second surface, a first buffer portion, and a second buffer portion, the second surface being opposite to the first surface in the stacking direction, the first buffer portion being provided on the first surface of the resin frame member, the first buffer portion being located outside of a power generation region of the membrane electrode assembly and connected to the reactant gas channel and the reactant gas manifold of the first separator, the second buffer portion being provided on the second surface of the resin frame member, the second buffer portion being located outside of the power generation region and connected to the reactant gas channel and the reactant gas manifold of the second separator, the second buffer portion being independent from the first buffer portion, wherein the resin frame member includes a first protruding portion on which at least a portion of the first buffer portion is disposed and a second protruding portion on which at least a portion of the second buffer portion is disposed, the first buffer portion and the second buffer portion each extending beyond an edge of the resin frame member disposed adjacent to the power generation region, and wherein the resin frame member has an external shape such that the resin frame member is disposed inward from the reactant gas manifold.

2. The fuel cell according to claim 1, wherein the reactant gas manifold of each of the first and second separators includes an oxidant gas inlet manifold, a fuel gas inlet manifold, an oxidant gas outlet manifold, and a fuel gas outlet manifold which are provided in corners of each of the first and second separators, wherein the first buffer portion comprises an oxidant-gas-side buffer portion, wherein the reactant gas channel of the first separator comprises an oxidant gas channel, wherein the oxidant-gas-side buffer portion includes a plurality of cathode-side inlet guide channels and a plurality of cathode-side outlet guide channels, the cathode-side inlet guide channels extending from the oxidant gas channel toward the oxidant gas inlet manifold of the first separator, the cathode-side outlet guide channels extending from the oxidant gas channel toward the oxidant gas outlet manifold of the first separator, wherein the second buffer portion comprises a fuel-gas-side buffer portion, wherein the reactant gas channel of the second separator comprises a fuel gas channel, and wherein the fuel-gas-side buffer portion includes a plurality of anode-side inlet guide channels and a plurality of anode-side outlet guide channels, the anode-side inlet guide channels extending from the fuel gas channel toward the fuel gas outlet manifold of the second separator, the anode-side outlet guide channels extending from the fuel gas channel toward the fuel gas outlet manifold of the second separator.

3. The fuel cell according to claim 2, wherein the oxidant-gas-side buffer portion includes an inlet-side embossed portion disposed between the cathode-side inlet guide channels and the oxidant gas inlet manifold, and an outlet-side embossed portion disposed between the cathode-side outlet guide channels and the oxidant gas outlet manifold, and wherein the fuel-gas-side buffer portion includes an inlet-side embossed portion disposed between the anode-side inlet guide channels and the fuel gas inlet manifold, and an outlet-side embossed portion disposed between the anode-side outlet guide channels and the fuel gas outlet manifold.

4. The fuel cell according to claim 1, wherein the first separator includes a flat surface facing the first buffer portion, and wherein the second separator includes a flat surface facing the second buffer portion.

5. The fuel cell according to claim 1, further comprising:

a third separator disposed adjacent to the first separator, wherein a coolant channel along which a coolant is to flow in an in-plane direction defined along the electrode surface is formed between the first and third separators, and wherein only one of the first and third separators includes a third buffer portion through which the coolant channel is in fluid communication with a coolant manifold, the third buffer portion being located outside of the power generation region.

6. The fuel cell according to claim 1, wherein the first buffer portion includes a first embossed portion, and the second buffer portion includes a second embossed portion, the first embossed portion and the second embossed portion respectively extend in a lateral direction that is substantially orthogonal to a flow of reactant gas over the power generation region such that the first embossed portion and the second embossed portion extend beyond an edge of the power generation region in the lateral direction.

7. The fuel cell according to claim 1, wherein at least the first separator or the second separator includes a coolant manifold extending a first distance in a direction substantially parallel to the reactant gas channel and a second distance in a direction substantially perpendicular to the reactant gas channel, the first distance being greater than the second distance.

8. The fuel cell according to claim 7, wherein the coolant manifold is located in a direction substantially orthogonal to a flow of reactant gas through the reactant gas channel.

9. The fuel cell according to claim 5, wherein the in-plane direction in which the coolant flows is substantially parallel to a direction of a flow of the reactant gas over the power generation region.

* * * * *